United States Patent [19]

Bachmann et al.

[11] 4,388,382

[45] Jun. 14, 1983

[54] PHOTOELECTROCHEMICAL CELLS

[75] Inventors: Klaus J. Bachmann, Piscataway, N.J.; Hans-Joachim Lewerenz, Berlin, Fed. Rep. of Germany; Maria T. A. S. Menezes, Tewksbury, N.J.

[73] Assignee: Bell Telephone Laboratories, Incorporated, Murray Hill, N.J.

[21] Appl. No.: 234,418

[22] Filed: Feb. 13, 1981

[51] Int. Cl.$^3$ .............................................. H01M 6/36
[52] U.S. Cl. .................................. 429/111; 204/56 R
[58] Field of Search ........................ 429/111; 204/56 R

[56] References Cited

U.S. PATENT DOCUMENTS 4,343,870  8/1982  Heller et al. ...................... 429/111

OTHER PUBLICATIONS

A. Heller, et al., "11.5% Solar Conversion Efficiency in the Photocathodically Protected p-InP/V$^{3+}$-V$^{2+}$-HCl/C Semiconductor Liquid Junction Cell", Appl. Phys. Lett., vol. 38, pp. 282-284 (1981).
M. J. Madou et al., "Photochemical Corrosion of Semiconductors for Solar Cells," SPIE, vol. 248, Role of Electro-Optics In Photovoltaic Energy Conversion, (1980), pp. 88-95.
D. S. Ginley, et al., "Interfacial Chemistry at p-GaP Photoelectrodes," J. Electrochem. Soc., vol. 129, pp. 2141-2145 (1982).
S. Gourgaud et al., "Semiconductor/Electrolyte Photoelectric Energy Conversion: The Use of a Molybdenum Oxide Coating to Avoid Corrosion," J. Electrochem. Soc., vol. 124, pp. 102-107 (1977).
H. Morisaki et al., "Iron-Oxide Coated n-Si as a Heterostructure Photoanode for the Photoelectrolysis of Water," Japan. J. Appl. Phys., vol. 19, pp. L148-L150 (1980).
Y. Nakato, et al., "Photo-Electrochemical Behaviors of Semiconductor Electrodes Coated with Thin Metal Films", Chem. Lett. pp. 883-886 (1975).
A. Heller et al., "An Efficient Photocathode for Semiconductor Liquid Junction Cells: 9.4% Solar Conversion Efficiency With p-InP/VCl$_3$-VCl$_2$-HCl/C", J. Am. Chem. Soc., vol. 102, pp. 6535-6556 (1980).
A. M. Van Wezema et al., "Study of the Schottky Barrier at the n- And p-Type InP Electrode/Electrolyte Interface," J. Electroanal. Chem., vol. 87, pp. 105-109 (1978).
A. A. K. Vervaet et al., "Some Electrochemical Processes at the n- And P-InP Electrodes", J. Electroanal. Chem., vol. 91, pp. 133-136 (1978).

Primary Examiner—Aaron Weisstuch
Attorney, Agent, or Firm—Bruce S. Schneider

[57] ABSTRACT

Photovoltaic devices are fabricated by forming a thin passivating layer, for example, an oxide layer on a semiconductor material. The passivating layer on the semiconductor material is then contacted with an electrolyte such as an electrolyte containing vanadium ions. The resulting electrolyte/passivating layer/semiconductor (EPLS) structure exhibits excellent solar conversion efficiencies and good stability.

8 Claims, 8 Drawing Figures

PHOTOELECTROCHEMICAL CELLS

BACKGROUND OF THE INVENTION

1. Field of the Invention

This invention relates to semiconductor devices and, more particularly, to photovoltaic devices.

2. Art Background

Intensive research has centered on the conversion of solar radiation into electricity. One means being explored for this conversion is the use of photovoltaic devices having an electrolyte/semiconductor interface. The sophistication of these electrolyte/semiconductor devices has rapidly increased. For example, early devices generally, although quite promising, exhibited severe interactions between the electrolyte and the semiconductor material, causing the semiconductor material to substantially degrade. The degradation that occurs is typified by the results observed when a $Fe(CN)_6{}^{-4}/Fe(CN)_6{}^{-3}$ electrolyte is used in conjunction with a CdS semiconductor material. (See H. Gerischer, *Journal of Electroanalytical Chemistry*, 58, 263 (1975).)

A variety of approaches has been employed to decrease the corrosion associated with electrolyte/semiconductor interfaces. For example, if a redox couple is used that competes efficiently with the decomposition or corrosion reaction, then the electrode becomes more stable. This phenomenon is employed when CdS is used in conjunction with a polysulfide electrolyte. (See A. B. Ellis et al., *Journal of the American Chemical Society*, 98, 1685 and 6855 (1976).) In such case the corrosion, as compared to that occurring in the $Fe(CN)_6{}^{-4}/Fe(CN)_6{}^{-3}$ electrolyte, is substantially reduced through the competing reaction $2e^- + S_n{}^{2-} \rightleftarrows S_{n-1}{}^{2-} + S^{2-}$.

Recently, the use of a vanadium containing electrolyte together with an InP cathode has also shown substantially improved corrosion resistance. (See A. Heller et al., *Journal of the American Chemical Society*, 102, 6555 (1980).) However, although these improvements have significantly increased the reliability of electrolyte/semiconductor photovoltaic devices, even more stable devices would still be advantageous.

Not only has the corrosion resistance of electrolyte/semiconductor cells significantly increased, but also the solar conversion efficiencies of these cells has followed a similar trend. In particular, the previously described vanadium electrolyte in conjunction with a single crystalline InP electrode yields efficiencies of approximately 9.4% at 110 mW/cm² illumination (approximately air mass 1). Efficiencies of this magnitude are a significant improvement from early cells. Obviously, however, even more improved efficiencies are always desirable.

SUMMARY OF THE INVENTION

The use of an electrolyte/passivating layer/semiconductor (EPLS) device yields both improved corrosion resistance and increased efficiency from that previously obtained in cells employing electrolytes. These cells are fabricated by forming a passivating layer on a semiconductor material. This passivating layer is then contacted with an electrolyte. The passivating layer, e.g., an insulator, must be sufficiently thin to allow exchange by tunneling of electrons through the passivating layer between the electrolyte and the semiconductor material. Additionally, the electrolyte, semiconductor, and passivating layer material must be carefully chosen so that the redox potential of the electrolyte and the decomposition or dissolution potential of the passivating layer has an appropriate relationship to the Fermi level of the semiconductor.

Especially advantageous results are obtained if the passivating layer is formed through use of an electrolytic cycling recess. For a vanadium electrolyte utilized in conjunction with an indium oxide passivating layer formed on an InP semiconductor material, solar conversion efficiencies up to 15% are obtained under AM2 conditions with good stability.

DETAILED DESCRIPTION

Figure 1:
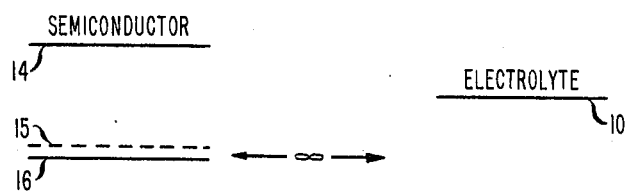
FIGS. 1–3 and 5 illustrate requirements for the subject devices.
Figure 2:
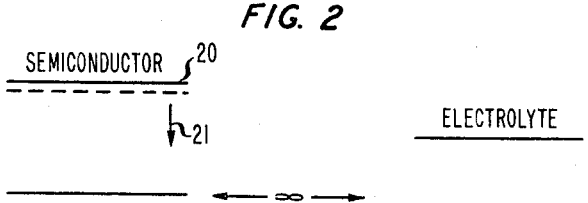
Figure 3:
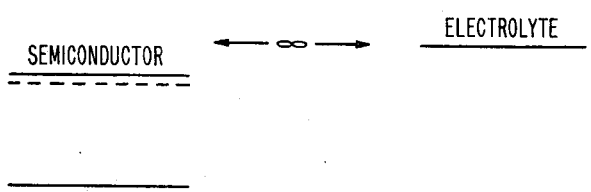

The electrolyte and semiconductor material employed in the inventive devices are chosen that their properties satisfy certain criteria. First, the energy difference (at infinite separation from any interacting material) between the Fermi level of the semiconductor material and its majority carrier band should be smaller than the difference (at infinite separation) between the majority carrier band of the semiconductor material and the redox level of the electrolyte. (The positive direction of energy is measured in the direction from the majority carrier band to the Fermi level.) For example, in FIG. 1, the redox potential of an electrolyte is indicated by line 10, and the conduction band, valence band, and Fermi level of the semiconductor material are indicated respectively by lines 14, 16, and 15. In the case of FIG. 1, where a p-type semiconductor is being illustrated, in Fermi level is closest to the valence band and, thus, the valence band is the majority carrier band. Therefore, for a p-type semiconductor material the positive direction of energy measurement is from the valence band toward the Fermi level. In FIG. 1, the redox level of the electrolyte is greater than the Fermi level of the semiconductor material and the criterion is satisfied. Similarly, as shown in FIG. 2, for an n-type semiconductor material the majority carrier band is the conduction band, 20, and the positive energy direction from this band is shown by arrow, 21. Therefore, the Fermi level of the semiconductor in FIG. 2 is less than the redox level of the electrolyte and the criterion is again satisfied. If the situation is as shown in FIG. 3, the redox level is negative, the Fermi level is positive, and the criterion is not satisfied.

To choose an appropriate combination of electrolyte and semiconductor material, it is necessary to determine the relative position of the redox level and Fermi level at infinite separation of the electrolyte and the semiconductor material, respectively. Redox potentials and Fermi levels are available from reported data. Additionally, established procedures are available for making such measurements. (See G. Charlot et al., *Selected Constants Oxydo-Reduction Potentials*, Pergamon Press, N.Y., 1958, and J. I. Pankove, *Optical Processes in Semiconductors*, Prentice Hall, Englewood Cliffs, N.J., 1971.) Redox potentials in electrolytes typically are reported on a different scale than that used for measurements of Fermi levels in semiconductor materials. Redox potentials are generally reported relative to a normal hydrogen electrode (NHE) and electrochemical potentials for semiconductor materials are generally reported relative to the vacuum level. The conversion to the same scale to insure that the previously discussed criterion is satisfied is relatively easy. The vacuum level potential of the NHE is $-4.73$ V. (See R. Gomer and G. Tryson, *Journal of Chemical Physics*, 66, 4413, (1977).) Generally, redox potentials are given as either positive or negative values relative to the NHE where the negative values refer to potentials closer to the vacuum level than the potential of the NHE. Thus, conversion to the vacuum level is a straightforward matter of addition.

The Fermi level of a p-type semiconductor is given by $E_F = E_i - kTln(N_p/N_i)$ where $E_i$ and $N_i$ are the intrinsic Fermi level and the intrinsic carrier concentration, respectively, for the semiconductor being employed, and $N_p$ is the hole concentration. (See S. Sze, *Physics of Semiconductor Devices*, Wiley-Interscience, N.Y., 1969, p. 38.) Similarly, the Fermi level of an n-type semiconductor relative to the vacuum level is given by $E_i + kTln(N_e/N_i)$ where $N_e$ is the electron concentration. (See S. Sze, *Physics of Semiconductor Devices*, Wiley-Interscience, N.Y., 1969, p. 37.) For a graph of $N_i$ for various semiconductors and for a method of determining $E_i$ and $N_i$, see S. Sze, *Physics of Semiconductors*, Wiley-Interscience, N.Y. 1969, FIG. 11 and p. 27, respectively.

Although the basic criterion for matching the electrolyte to the semiconductor is given above, one caveat should be observed. Under certain circumstances, the interaction between the electrolyte and the passivating layer can cause dissolution and/or decomposition of this passivating layer. The composition of the passivating layer and the electrolyte should be chosen to avoid substantial degradation of the passivating layer. Decomposition of the passivating layer occurs either through an oxidation or reduction reaction. In the case of a passivating material that is reductively decomposed, e.g., an oxide, decomposition can occur if the electrochemical potential $\epsilon_d = -\Delta G/nF$ (where $\Delta G$ is the free energy of the decomposition reaction, n is the number of electrons participating in the reaction, and F is the Faraday constant) is further away from the vacuum level than the electrochemical potential, $\epsilon_r$, of the redox electrolyte. That is, a passivating material, e.g., an oxide, is stable with respect to reductive decomposition if $\epsilon_d$ is closer to the vacuum level than $\epsilon_r$. Similarly, for a passivating material that is oxidatively decomposed, the condition for thermodynamic stability is that $\epsilon_d$ be further from the vacuum level than $\epsilon_r$.

Even if the relation between the decomposition potential and the redox potential is such that decomposition is thermodynamically allowable, it is possible that the kinetics of the decomposition process is sufficiently slow that for practical purposes the interactions between the passivating layer and the electrolyte are negligible. Although this situation is not typical, combinations of electrolytes and passivating materials that are thermodynamically unstable but which do not degrade because of the kinetics of the decomposition reaction are not precluded. Additionally, it is possible to satisfy the conditions of chemical stability by employing a multilayer passivating film. For example, a native oxide is overlaid by an inert material such as a noble metal that does not chemically interact with the electrolyte.

Appreciable dissolution of the passivating layer in the electrolyte should also be avoided. The extent of dissolution is determined by the solubility product of the passivating material and the concentration in the electrolyte of entities corresponding to the dissolved components of the passivating material. Dissolution is necessarily prevented if the product of the concentrations of the dissolution components is equal or higher than those dictated by the solubility product. However, even if this situation is not producible, (for example, the need for a conductive electrolyte prevents maintenance of a suitable component concentration), kinetic factors often prevent undesirable dissolution rates, i.e., rates larger than 1 Angstrom per minute. In the case of oxides, kinetic factors very often do lead to dissolution rates less than 1 Angstrom per minute, indeed, less than 1 Angstrom per hour. It is possible to ascertain the effect of kinetics for the dissolution of decomposition situation simply by using a controlled sample device operating under illumination at the maximum power point. (See K. J. Bachmann, *Materials Aspects of Solar Cells*, 3, of *Current Topics in Materials Science*, page 483, North Holland Publishers, Amsterdam, 1979, for a definition of maximum power point.)

The electrolyte, whether solid or liquid (aqueous or non-aqueous), is composed of the redox couple, a counter ion, a transport medium, and if necessary a supporting electrolyte that is employed to maintain high conductivity. (Conductivities greater than $0.01\Omega^{-1}cm^{-1}$ are desirable to avoid excessive series resistance loss.). For example, in an aqueous solution of HCl and vanadium chloride, HCl is the supporting electrolyte, $Cl^{31}$ is the counter ion, water is the transport medium, and $V^{+3} \rightleftarrows V^{2+}$ is the redox couple. Generally, the particular choice of counter ion and supporting electrolyte is not significant. However, in some circumstances, the counter ion and/or the supporting electrolyte catalyzes the dissolution of the passivating layer. Again dissolution rates should be kept below 1 Angstrom per minute by avoiding a counter ion and supporting electrolyte that promotes such catalysis.

The passivating layer should also be carefully fabricated. First, as previously discussed, there should be no significant chemical interaction between the electrolyte and the passivating layer, under the operating conditions of the final device, i.e., when the cell is illuminated, and under load. The passivating layer should also be continuous, i.e., at least one monolayer thick over the active region of the device. These conditions are generally easily satisfied. It is most convenient to employ a native film, such as a native oxide film, for the passivating layer since it is possible to grow this film directly onto the semiconductor. However, the use of other passivating materials that are deposited by conventional techniques such as evaporation or sputtering is not precluded. In circumstances where the native film is not suitable, other passivating layers are, in fact, advantageously employed.

Additionally, the interface between the passivating layer and the semiconductor material should generally have a low density of surface states, i.e., a density less than $10^{11}$ cm$^{-2}$. This criterion is typically satisfied for combinations of passivating materials and semiconductor materials provided the lattice mismatch is less than 0.1% and no chemical interactions occur at the interface. Nevertheless, it is generally advantageous to check the degree of interface states for a given device. For example, the degree of surface states between the insulating layer and the semiconductor material is determinable by monitoring the frequency dependence of the capacitance and of the conductance of the insulator semiconductor interface, as described in E. H. Nicollian and A. Goetzberger, *The Bell System Technical Journal,* 46, page 1055, (1967). Alternatively, the density and distribution of interface states are determined by Deep Level Transient Spectroscopy (DLTS). This technique is a conventional procedure and is described in Miller et al., *Annual Reviews of Material Science,* 7, 377, (1977).

Figure 5:
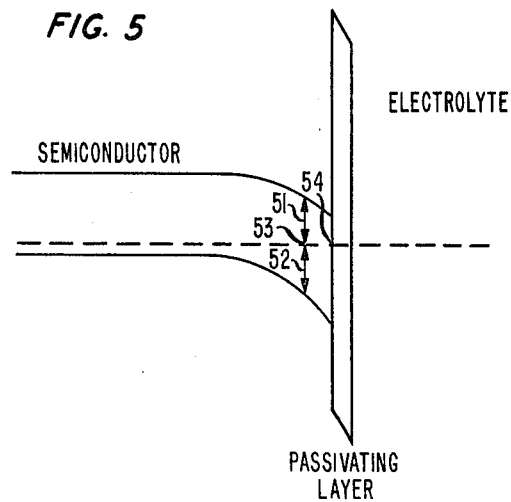

The limitation on interface state density is significantly relaxed if inversion exists at the semiconductor/passivating layer interface, i.e., the population of minority carriers in the minority carrier band in the vicinity of the interface is greater than the population of majority carriers in the majority carrier band. (A majority carrier in this context is the specie that is the majority carrier in the bulk material.) The inversion situation is shown, for example, in FIG. 5 for a p-type semiconductor material. The inversion occurs when the absolute value of the difference between the electrochemical potentials of the semiconductor (the Fermi level) and the electrolyte at infinite separation is larger than half the bandgap of the semiconductor material. The farther inversion moves the point, 53, where the semiconductor material is intrinsic from the metallurgical interface, 54, the less the effect of interface states. (The point, 53, where the semiconductor material becomes intrinsic is where the distance, 51, between the Fermi level and the conduction band is equal to the distance, 52, between the Fermi level and the valence band.)

The passivating layer acts as a barrier for chemical interaction between the semiconductor and the electrolyte material. Therefore, stability is obtained. However, the passivating layer must not act as a barrier to reduce excessively the electronic interaction between these materials. To avoid electronic isolation, an insulating layer should be sufficiently thin that tunneling of electrons occurs through the insulating material between the semiconductor and the electrolyte. Generally, to satisfy this requirement the thickness of the insulating layer should be in the range of 50 Angstroms to a single monolayer, preferably 4 to 20 Angstroms.

Figure 6:
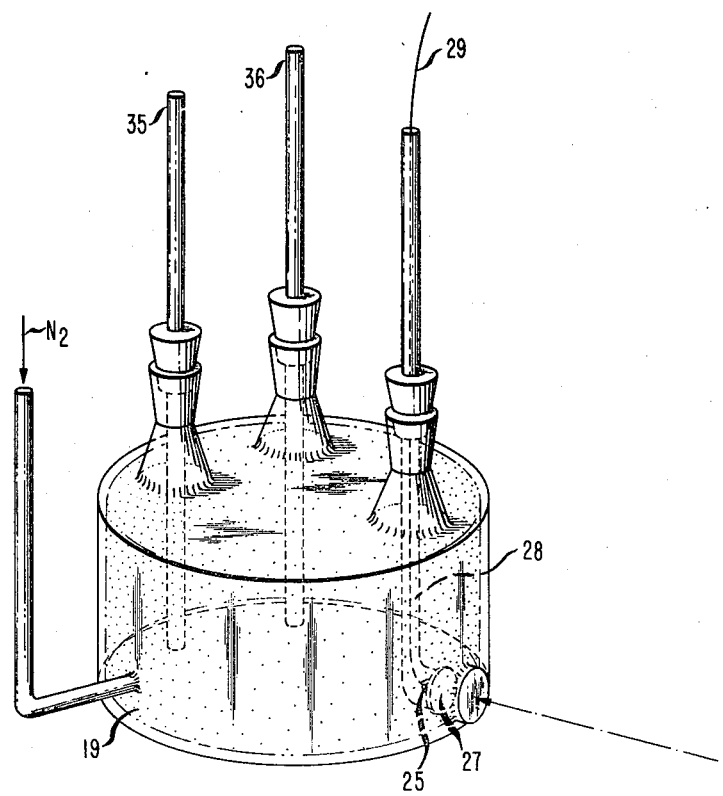

In a preferred embodiment, a suitably thin layer that yields a low density of interface states is formed by a cyclic electrolytic process. In an exemplary process, a cell, such as shown in FIG. 6, is employed. A potentiostat is connected to a counterelectrode 35 in FIG. 6, and to a reference electrode, 36. The material used for the counterelectrode and reference electrode is conventional, e.g., a carbon rod for each electrode. Electrical contact to the semiconductor material is then made by conventional techniques, e.g., metallization to form an ohmic contact material and attachment of a wire by a conductive adhesive to the metallization. The semiconductor material is also connected to the potentiostat. (Suitable electronic circuitry used in conjunction with the potentiostat is described in A. Bewick et al., *Electrochim Acta* 8, 89 (1963), 11, 1397, (1966); Y. Tacussel, ibid, 11, 449 (1966).) The semiconductor material together with the counterelectrode and reference electrode are inserted into an electrolyte as a first step to forming a native passivating layer. Although it is convenient in forming the passivating layer to use an electrolyte of the same composition that is to be employed in the ultimate photovoltaic cell, the use of other electrolytes for forming the passivating layer is not precluded. The use of electrolytes to form passivating layers on semiconductor materials is described in the literature for a variety of electrolyte-semiconductor combinations. (See, for example, B. Schwartz, *CRC Critical Review in Solid State and Materials Sciences,* 5, 609 (1975).)

Figure 7:
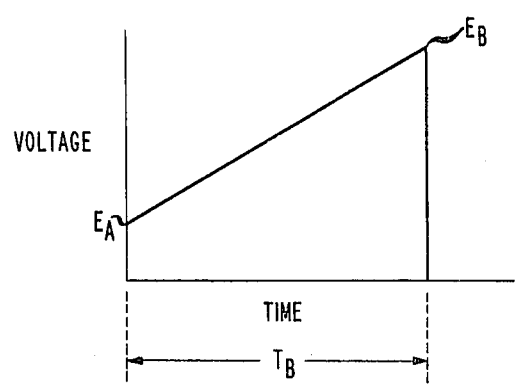

The semiconductor material is illuminated with light in the wavelength range 0.4 to 1 $\mu$m, preferably illuminated by simulated solar light, e.g., light from a filtered tungsten-halogen lamp. (The light used for illumination should include a distribution of wavelengths having a substantial portion of these wavelengths corresponding to an energy greater than the semiconductor bandgap.) The circuit between the counterelectrode and the semiconductor device is open. The voltage applied is calibrated by measuring the potential of the reference electrode, $\epsilon_o$, 7 in FIG. 4, which is chosen to be in the potential range where the native film is not stable, i.e., $\epsilon_o$ is negative with respect to the Flade potential 13 in FIG. 4, where film growth initiates. The open circuit is then closed and the potentiostat is operated so that the potential between the counterelectrode and the semiconductor material relative to the reference electrode varies with time, preferably varies linearly with time cyclically between $E_A$ and $E_B$ as shown in FIG. 7, except for the first cycle that runs from $V_{oc}$ to $\epsilon_o$ and back such as the first cycle shown in FIG. 8.

Figure 4:
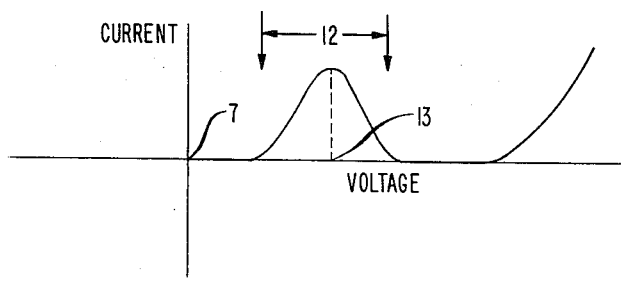
FIGS. 4, 6–8 illustrate a means of constructing devices within the subject invention.
Figure 8:
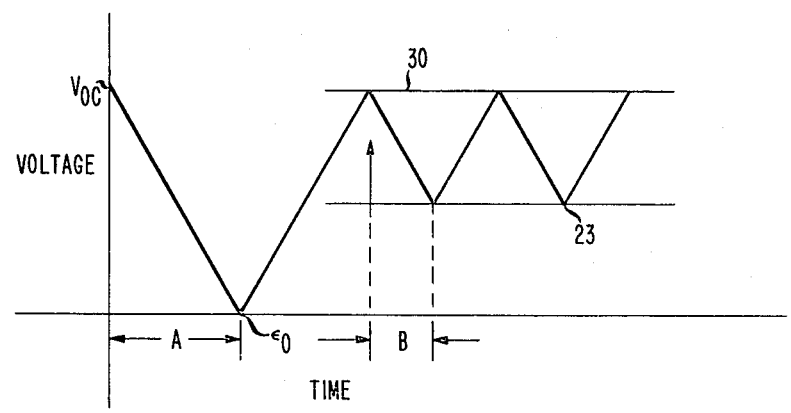

The slope and the endpoints $E_A$ and $E_B$ of this voltage variation determines the thickness and quality of the oxide coat. To determine these parameters controlled samples are used. With a controlled sample connected to the potentiostat under the conditions described, a voltage to time variation as shown in FIG. 8 is applied where the time denoted A is sufficient to cause the removal of essentially any native film on the electrode, e.g., is in the range 1 second to 1 hour, preferably in the range 30 seconds to 5 minutes, and the time denoted by B is in the range 1 second to 1 hour, preferably, for example, in the case of InP in the range 10 seconds to 1 minute. The potential starts at $V_{oc}$, i.e., that voltage that corresponds to no current flow between the semiconductor and the counterelectrode. The voltage is decreased during time period A to the voltage $\epsilon_o$. The voltage is then increased back to $V_{oc}$ and subsequently cycled between $V_{oc}$ and an endpoint voltage, 23. The endpoint voltage is chosen so that the native film is partially removed as the voltage decreases from $V_{oc}$ and formed as the voltage increases from the endpoint voltage. (A voltammogram such as shown in FIG. 4 shows an appropriate voltage range, 12, corresponding to the voltage range between $V_{oc}$ and the endpoint voltage, 23.) For example, in the case of p-InP, the voltage used is in the range 0 to 0.5 V versus NHE. The cycling is continued using the endpoint voltages denoted 23 in FIG. 8. During each voltage cycle from $V_{oc}$ to the endpoint voltage and back, the I-V curve is monitored. Cycling is continued until the power conversion efficiency of this I-V curve no longer improves. (See K. J. Bachmann, *Materials Aspects of Solar Cells,* 3, of *Current Topics in Materials Science,* page 483, North Holland Publishers, Amsterdam, 1979, for the definition of power conversion efficiency.) The endpoint voltage is made more positive, typically by an amount in the range 10 to 100 mV, preferably 40 to 60 mV, and the same cyclic procedure corresponding to the graph in FIG. 8 is used. This change in the endpoint and recycling continues until the power conversion efficiency no longer improves. (If the conversion efficiency becomes worse from one endpoint to the next, an intermediate endpoint is chosen to arrive at the best value.) The final voltage $E_A$ employed for the best power conversion efficiency is noted. The same cyclic process is then repeated using a different time interval, B. Again, the I-V curve is monitored and the time $T_B$ that yields the best fill factor is noted. A third set of samples is then employed using the cyclic voltage-to-time relation shown in FIG. 8 with the endpoint, 23, being that determined with the previous set of controlled samples and with the endpoint, 30, being raised after each cyclic procedure. The changes of endpoint, 30, between runs are the same as employed when $E_A$ is determined. The endpoint $E_B$ employed when the power conversion efficiency no longer improves is the endpoint to be used for making the oxide. (Where the electrolyte for forming the passivating layer is different from that used in the final device, the power conversion efficiency is not monitored in situ. After each cycling procedure, the semiconductor is removed from the passivating electrolyte, rinsed, immersed in the final electrolyte, and the power conversion efficiency is measured.) In this manner, the $E_A$ and $E_B$ endpoints and the time period $T_B$ for producing the oxide coat are determined. Utilizing these parameters, the oxide coat is formed on the semiconductor material using a saw tooth voltage cycle, half of which is shown in FIG. 7. The cycling is continued until a continuous, uniform passivating layer is obtained. Typically, 1 to 20 cycles from $E_A$ to $E_B$ and back in the case of InP, preferably 4 to 7 cycles, are employed.

The final cell is then fabricated by contacting the passivating layer with the desired electrolyte and also contacting this electrolyte with a counterelectrode, for example, a carbon electrode. Conventional methods are used to form electrical contact to the counterelectrode and the semiconductor material.

The following example illustrates the inventive device and the inventive technique utilized for forming these devices

EXAMPLE

A Zn-doped InP crystal (resistivity of 0.287 ohms/cm and majority carrier concentration of $2.4 \times 10^{17}/cm^3$ [31 3]) grown by the gradient freeze technique was employed. The crystal was cut into ~1 mm thick wafers with the largest face parallel to the (111) plane. The (111)-A face was polished in an approximately 2% bromine in methanol solution. An ohmic contact was made to the (111)-B face by sequentially depositing by evaporation 300 Angstroms of Zn and 1000 Angstroms of Au. The contact was subsequently heated to 450 degrees C for ~5 seconds. A copper lead was attached to the metallized face with a 14:5:1 by weight suspension of silver powder in a mixture of epoxy and hardener. The crystal with the lead was then encapsulated into epoxy (25 in FIG. 6) leaving the major part of the (111)-A face, 27, exposed. This face of the crystal was then etched in a 1:2:2 by volume mixture of $HCl:HNO_3:H_2O$ for approximately 10 seconds, rinsed and re-etched until the surface appeared matte.

An electrolyte solution was prepared by dissolving 5.2 g $V_2O_5$ and 5.5 g Zn in 105 ml $H_2$) and 75 ml HCl. The electrolyte was flushed with nitrogen gas over a period of 4 hours. The solution was brought to a potential of $-0.48$ V versus a saturated calomel electrode by bubbling sufficient oxygen into the electrolyte to oxidize the necessary amount of the $V^{2+}$ ions formed in the previous Zn reduction step back to the $V^{3+}$ state. After the desired potential was reached, the solution was maintained under a nitrogen atmosphere.

The p-InP electrode, 28, was inserted into the solution, 19, under open circuit conditions. It was then connected through lead, 29, to an electronic potentiostat which was also connected to two carbon rods that serve as counter and reference electrodes, respectively. An open circuit condition was maintained, and the solution was magnetically stirred. The stirring rate was 100 to 200 rpm. The electrode was then illuminated using a 100 Watt tungsten-halogen lamp at a distance of ~3 cm from the electrode. The electrode potential was then scanned in the cathodic direction at a rate of ~20 mV/sec to short circuit condition and back to the open circuit condition. ($V_{oc}$ is ~ $+0.7$ V with respect to the redox potential $\epsilon_0$ of the $V^{2+}/V^{3+}$ couple measured by the carbon reference electrode.)

The current voltage characteristic during this first scanning cycle showed a poor performance and considerable hysteresis between the initial scan into cathodic direction and the subsequent scan in the anodic direction. The electrode potential was then cycled 6 times at a rate of 20 mV/sec using, after the first cycle from $V_{oc}$ to $\epsilon_0$ and back to $V_{oc}$, a voltage varying in each cycle between $+0.15$ and $+0.55$ V versus NHE. The cycling was stopped.

The InP electrode with its passivating layer was then used in a device. This device was made using the same electrolyte as used in producing the passivating layer and a counterelectrode of carbon. A solar conversion efficiency of 15% under AM2 was measured which compares to 12% efficiency without cyclic production of a passivating layer. Simulated solar light produced by a tungsten-halogen lamp in conjunction with a Schott KG(2) filter was used. The incident power density was measured by a metrologic radiometer.

What is claimed is:

1. A device comprising an electrolyte, a semiconductor electrode, and means for electrically contacting said electrolyte and said semiconductor electrode characterized in that a passivating layer is formed on said semiconductor electrode by a process comprising a cyclic electrolyte technique, wherein said passivating layer is continuous, and is sufficiently thin so that tunneling of electrons through said passivating layer is allowed, wherein the energy difference between the Fermi level and the majority carrier band of said semiconductor material is smaller than the energy difference at infinite separation between said majority carrier band and the redox level of said electrolyte, and whereby when light is absorbed in said semiconductor material electrical power is generated.

2. The device of claim 1 wherein said semiconductor material is InP.

3. The device of claim 1 or 2 wherein said passivating layer is a native film.

4. The device of claim 3 wherein said native film is a native oxide.

5. The device of claim 3 wherein said electrolyte contains vanadium ions.

6. The device of claim 1 wherein said electrolyte contains vanadium ions.

7. The device of claim 1 wherein said passivating layer is formed in an electrolyte containing vanadium ions.

8. The device of claim 1 wherein said means for contacting said electrolyte is a platinum electrode.

* * * * *

UNITED STATES PATENT AND TRADEMARK OFFICE
CERTIFICATE OF CORRECTION

PATENT NO. : 4,388,382

DATED : June 14, 1983

INVENTOR(S) : Klaus J. Bachmann, Hans J. Lewerenz and Maria T. A. S. Menezes

It is certified that error appears in the above-identified patent and that said Letters Patent is hereby corrected as shown below:

Column 4, line 30, "$Cl^{31}$" should read --$Cl^-$--. Column 7, line 39, "$cm^{31\ 3}$" should read --$cm^{-3}$--. Column 7, line 58, "$H_2$)" should read --$H_2O$--.

Signed and Sealed this

Eighth Day of November 1983

[SEAL]

Attest:

GERALD J. MOSSINGHOFF

Attesting Officer

Commissioner of Patents and Trademarks